US008501084B2

(12) United States Patent
Cooper

(10) Patent No.: US 8,501,084 B2
(45) **Date of Patent: *Aug. 6, 2013**

(54) SUPPORT POSTS FOR MOLTEN METAL PUMPS

(76) Inventor: Paul V. Cooper, Chesterland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/047,747

(22) Filed: Mar. 14, 2011

(65) Prior Publication Data

US 2011/0210232 A1 Sep. 1, 2011

Related U.S. Application Data

(62) Division of application No. 10/773,118, filed on Feb. 4, 2004, now Pat. No. 7,906,068.

(51) Int. Cl.
*F16M 13/02* (2006.01)

(52) U.S. Cl.
USPC .......................................... 266/233; 266/239

(58) Field of Classification Search
USPC .................................................. 266/239, 233
See application file for complete search history.

(56) References Cited

U.S. PATENT DOCUMENTS

| | | | |
|---|---|---|---|
| 35,604 | A | 6/1862 | Guild |
| 116,797 | A | 7/1871 | Barnhart |
| 209,219 | A | 10/1878 | Bookwalter |
| 251,104 | A | 12/1881 | Finch |
| 364,804 | A | 6/1887 | Cole |
| 495,760 | A | 4/1893 | Seitz |
| 506,572 | A | 10/1893 | Wagener |
| 585,188 | A | 6/1897 | Davis |
| 757,932 | A | 4/1904 | Jones |
| 882,477 | A | 3/1908 | Neumann |
| 882,478 | A | 3/1908 | Neumann |
| 890,319 | A | 6/1908 | Wells |

(Continued)

FOREIGN PATENT DOCUMENTS

| | | |
|---|---|---|
| CA | 683469 | 3/1964 |
| CA | 2115929 | 8/1992 |

(Continued)

OTHER PUBLICATIONS

USPTO; Final Office Action dated Nov. 28, 2011 in U.S. Appl. No. 12/120,190.

(Continued)

*Primary Examiner* — Scott Kastler
(74) *Attorney, Agent, or Firm* — Snell & Wilmer L.L.P.

(57) ABSTRACT

An improved post clamp for a molten metal pump includes a support post clamp that supports the weight of a pump superstructure on the top of the support posts. The clamp preferably includes (a) a bottom flange for connecting to the pump superstructure, (b) a cavity for receiving an end of a support post, wherein the end has a top surface, and (c) a top flange for being positioned above the top surface. In operation the top flange rests on the top surface of the support post thereby supporting at least part of the weight of the superstructure. It is preferred that a plurality of support posts and post clamps according to the invention be used with a molten metal pump wherein the top surface of each support post supports some of the weight of the superstructure. Also disclosed are novel support posts that may be used with the post clamp, and a pump in which the post clamp and/or support posts may be used.

7 Claims, 4 Drawing Sheets

U.S. PATENT DOCUMENTS

| | | | |
|---|---|---|---|
| 898,499 | A | 9/1908 | O'Donnell |
| 909,774 | A | 1/1909 | Flora |
| 919,194 | A | 4/1909 | Livingston |
| 1,037,659 | A | 9/1912 | Rembert |
| 1,100,475 | A | 6/1914 | Franckaerts |
| 1,196,758 | A | 9/1916 | Blair |
| 1,331,997 | A | 2/1920 | Neal |
| 1,377,101 | A | 5/1921 | Sparling |
| 1,380,798 | A | 6/1921 | Hansen et al. |
| 1,439,365 | A | 12/1922 | Hazell |
| 1,454,967 | A | 5/1923 | Gill |
| 1,470,607 | A | 10/1923 | Hazell |
| 1,513,875 | A | 11/1924 | Wilke |
| 1,518,501 | A | 12/1924 | Gill |
| 1,522,765 | A | 1/1925 | Wilke |
| 1,526,851 | A | 2/1925 | Hall |
| 1,669,668 | A | 5/1928 | Marshall |
| 1,673,594 | A | 6/1928 | Schmidt |
| 1,697,202 | A | 1/1929 | Nagle |
| 1,717,969 | A | 6/1929 | Goodner |
| 1,718,396 | A | 6/1929 | Wheeler |
| 1,896,201 | A | 2/1933 | Sterner-Rainer |
| 1,988,875 | A | 1/1935 | Saborio |
| 2,013,455 | A | 9/1935 | Baxter |
| 2,038,221 | A | 4/1936 | Kagi |
| 2,090,162 | A | 8/1937 | Tighe |
| 2,091,677 | A | 8/1937 | Fredericks |
| 2,138,814 | A | 12/1938 | Bressler |
| 2,173,377 | A | 9/1939 | Schultz, Jr. et al. |
| 2,264,740 | A | 12/1941 | Brown |
| 2,280,979 | A | 4/1942 | Rocke |
| 2,290,961 | A | 7/1942 | Heuer |
| 2,300,688 | A | 11/1942 | Nagle |
| 2,304,849 | A | 12/1942 | Ruthman |
| 2,368,962 | A | 2/1945 | Blom |
| 2,383,424 | A | 8/1945 | Stepanoff |
| 2,423,655 | A | 7/1947 | Mars et al. |
| 2,488,447 | A | 11/1949 | Tangen et al. |
| 2,493,467 | A | 1/1950 | Sunnen |
| 2,515,097 | A | 7/1950 | Schryber |
| 2,515,478 | A | 7/1950 | Tooley et al. |
| 2,528,208 | A | 10/1950 | Bonsack et al. |
| 2,528,210 | A | 10/1950 | Stewart |
| 2,543,633 | A | 2/1951 | Lamphere |
| 2,566,892 | A | 9/1951 | Jacobs |
| 2,625,720 | A | 1/1953 | Ross |
| 2,626,086 | A | 1/1953 | Forrest |
| 2,676,279 | A | 4/1954 | Wilson |
| 2,677,609 | A | 5/1954 | Moore et al. |
| 2,698,583 | A | 1/1955 | House et al. |
| 2,714,354 | A | 8/1955 | Farrand |
| 2,762,095 | A | 9/1956 | Pemetzrieder |
| 2,768,587 | A | 10/1956 | Corneil |
| 2,775,348 | A | 12/1956 | Williams |
| 2,779,574 | A | 1/1957 | Schneider |
| 2,787,873 | A | 4/1957 | Hadley |
| 2,808,782 | A | 10/1957 | Thompson et al. |
| 2,809,107 | A | 10/1957 | Russell |
| 2,821,472 | A | 1/1958 | Peterson et al. |
| 2,824,520 | A | 2/1958 | Bartels |
| 2,832,292 | A | 4/1958 | Edwards |
| 2,853,019 | A | 9/1958 | Thorton |
| 2,865,618 | A | 12/1958 | Abell |
| 2,901,677 | A | 8/1959 | Chessman et al. |
| 2,906,632 | A | 9/1959 | Nickerson |
| 2,918,876 | A | 12/1959 | Howe |
| 2,948,524 | A | 8/1960 | Sweeney et al. |
| 2,958,293 | A | 11/1960 | Pray, Jr. |
| 2,978,885 | A | 4/1961 | Davison |
| 2,984,524 | A | 5/1961 | Franzen |
| 2,987,885 | A | 6/1961 | Hodge |
| 3,010,402 | A | 11/1961 | King |
| 3,015,190 | A | 1/1962 | Arbeit |
| 3,039,864 | A | 6/1962 | Hess |
| 3,044,408 | A | 7/1962 | Mellott |
| 3,048,384 | A | 8/1962 | Sweeney et al. |
| 3,070,393 | A | 12/1962 | Silverberg et al. |
| 3,092,030 | A | 6/1963 | Wunder |
| 3,099,870 | A | 8/1963 | Seeler |
| 3,130,678 | A | 4/1964 | Chenault |
| 3,130,679 | A | 4/1964 | Sence |
| 3,171,357 | A | 3/1965 | Egger |
| 3,203,182 | A | 8/1965 | Pohl |
| 3,227,547 | A | 1/1966 | Szekely |
| 3,244,109 | A | 4/1966 | Barske |
| 3,251,676 | A | 5/1966 | Johnson |
| 3,255,702 | A | 6/1966 | Gehrm |
| 3,258,283 | A | 6/1966 | Winberg et al. |
| 3,272,619 | A | 9/1966 | Sweeney et al. |
| 3,289,473 | A | 12/1966 | Louda |
| 3,289,743 | A | 12/1966 | Louda |
| 3,291,473 | A | 12/1966 | Sweeney et al. |
| 3,374,943 | A | 3/1968 | Cervenka |
| 3,400,923 | A | 9/1968 | Howie et al. |
| 3,417,929 | A | 12/1968 | Secrest et al. |
| 3,432,336 | A | 3/1969 | Langrod |
| 3,459,133 | A | 8/1969 | Scheffler |
| 3,459,346 | A | 8/1969 | Tinnes |
| 3,477,383 | A | 11/1969 | Rawson et al. |
| 3,487,805 | A | 1/1970 | Satterthwaite |
| 1,185,314 | A | 3/1970 | London |
| 3,512,762 | A | 5/1970 | Umbricht |
| 3,512,788 | A | 5/1970 | Kilbane |
| 3,561,885 | A | 2/1971 | Lake |
| 3,575,525 | A | 4/1971 | Fox et al. |
| 3,618,917 | A | 11/1971 | Fredrikson |
| 3,620,716 | A | 11/1971 | Hess |
| 3,650,730 | A | 3/1972 | Derham et al. |
| 3,689,048 | A | 9/1972 | Foulard et al. |
| 3,715,112 | A | 2/1973 | Carbonnel |
| 3,732,032 | A | 5/1973 | Daneel |
| 3,737,304 | A | 6/1973 | Blayden |
| 3,737,305 | A | 6/1973 | Blayden et al. |
| 3,743,263 | A | 7/1973 | Szekely |
| 3,743,500 | A | 7/1973 | Foulard et al. |
| 3,753,690 | A | 8/1973 | Emley et al. |
| 3,759,628 | A | 9/1973 | Kempf |
| 3,759,635 | A | 9/1973 | Carter et al. |
| 3,767,382 | A | 10/1973 | Bruno et al. |
| 3,776,660 | A | 12/1973 | Anderson et al. |
| 3,785,632 | A | 1/1974 | Kraemer et al. |
| 3,787,143 | A | 1/1974 | Carbonnel et al. |
| 3,799,522 | A | 3/1974 | Brant et al. |
| 3,799,523 | A | 3/1974 | Seki |
| 3,807,708 | A | 4/1974 | Jones |
| 3,814,400 | A | 6/1974 | Seki |
| 3,824,028 | A | 7/1974 | Zenkner et al. |
| 3,824,042 | A | 7/1974 | Barnes et al. |
| 3,836,280 | A | 9/1974 | Koch |
| 3,839,019 | A | 10/1974 | Bruno et al. |
| 3,844,972 | A | 10/1974 | Tully, Jr. et al. |
| 3,871,872 | A | 3/1975 | Downing et al. |
| 3,873,073 | A | 3/1975 | Baum et al. |
| 3,873,305 | A | 3/1975 | Claxton et al. |
| 3,881,039 | A | 4/1975 | Baldieri et al. |
| 3,886,992 | A | 6/1975 | Maas et al. |
| 3,915,594 | A | 10/1975 | Nesseth |
| 3,915,694 | A | 10/1975 | Ando |
| 3,941,588 | A | 3/1976 | Dremann |
| 3,941,589 | A | 3/1976 | Norman et al. |
| 3,954,134 | A | 5/1976 | Maas et al. |
| 3,958,979 | A | 5/1976 | Valdo |
| 3,958,981 | A | 5/1976 | Forberg et al. |
| 3,961,778 | A | 6/1976 | Carbonnel et al. |
| 3,966,456 | A | 6/1976 | Ellenbaum et al. |
| 3,967,286 | A | 6/1976 | Andersson et al. |
| 3,972,709 | A | 8/1976 | Chin et al. |
| 3,984,234 | A | 10/1976 | Claxton et al. |
| 3,985,000 | A | 10/1976 | Hartz |
| 3,997,336 | A | 12/1976 | van Linden et al. |
| 4,003,560 | A | 1/1977 | Carbonnel |
| 4,008,884 | A | 2/1977 | Fitzpatrick et al. |
| 4,018,598 | A | 4/1977 | Markus |
| 4,052,199 | A | 10/1977 | Mangalick |
| 4,055,390 | A | 10/1977 | Young |
| 4,063,849 | A | 12/1977 | Modianos |
| 4,068,965 | A | 1/1978 | Lichti |

4,091,970 A 5/1978 Komiyama et al.
4,119,141 A 10/1978 Thut et al.
4,126,360 A 11/1978 Miller et al.
4,128,415 A 12/1978 van Linden et al.
4,169,584 A 10/1979 Mangalick
4,191,486 A 3/1980 Pelton
4,213,742 A 7/1980 Henshaw
4,242,039 A 12/1980 Villard et al.
4,244,423 A 1/1981 Thut et al.
4,286,985 A 9/1981 van Linden et al.
4,305,214 A 12/1981 Hurst
4,322,245 A 3/1982 Claxton
4,338,062 A 7/1982 Neal
4,347,041 A 8/1982 Cooper
4,351,514 A 9/1982 Koch
4,355,789 A 10/1982 Dolzhenkov et al.
4,360,314 A 11/1982 Pennell
4,370,096 A 1/1983 Church
4,372,541 A 2/1983 Bocourt et al.
4,375,937 A 3/1983 Cooper
4,389,159 A 6/1983 Sarvanne
4,392,888 A 7/1983 Eckert et al.
4,410,299 A 10/1983 Shimoyama
4,419,049 A 12/1983 Gerboth et al.
4,456,424 A 6/1984 Araoka
4,470,846 A 9/1984 Dube
4,474,315 A 10/1984 Gilbert et al.
4,496,393 A 1/1985 Lustenberger
4,504,392 A 3/1985 Groteke
4,537,624 A 8/1985 Tenhover et al.
4,537,625 A 8/1985 Tenhover et al.
4,556,419 A 12/1985 Otsuka et al.
4,557,766 A 12/1985 Tenhover et al.
4,586,845 A 5/1986 Morris
4,592,700 A 6/1986 Toguchi et al.
4,594,052 A 6/1986 Niskanen
4,598,899 A 7/1986 Cooper
4,600,222 A 7/1986 Appling
4,607,825 A 8/1986 Briolle et al.
4,609,442 A 9/1986 Tenhover et al.
4,611,790 A 9/1986 Otsuka et al.
4,617,232 A 10/1986 Chandler et al.
4,634,105 A 1/1987 Withers et al.
4,640,666 A 2/1987 Sodergard
4,655,610 A 4/1987 Al-Jaroudi
4,684,281 A 8/1987 Patterson
4,685,822 A 8/1987 Pelton
4,696,703 A 9/1987 Henderson et al.
4,701,226 A 10/1987 Henderson et al.
4,702,768 A 10/1987 Areauz et al.
4,714,371 A 12/1987 Cuse
4,717,540 A 1/1988 McRae et al.
4,739,974 A 4/1988 Mordue
4,743,428 A 5/1988 McRae et al.
4,747,583 A 5/1988 Gordon et al.
4,767,230 A 8/1988 Leas, Jr.
4,770,701 A 9/1988 Henderson et al.
390,319 A 10/1988 Thomson
4,786,230 A 11/1988 Thut
4,802,656 A 2/1989 Hudault et al.
4,804,168 A 2/1989 Otsuka et al.
4,810,314 A 3/1989 Henderson et al.
4,834,573 A 5/1989 Asano et al.
4,842,227 A 6/1989 Harrington et al.
4,844,425 A 7/1989 Piras et al.
4,851,296 A 7/1989 Tenhover et al.
4,859,413 A 8/1989 Harris et al.
4,867,638 A 9/1989 Handtmann et al.
4,884,786 A 12/1989 Gillespie
4,898,367 A 2/1990 Cooper
4,908,060 A 3/1990 Duenkelmann
4,923,770 A 5/1990 Grasselli et al.
4,930,986 A 6/1990 Cooper
4,931,091 A 6/1990 Waite et al.
4,940,214 A 7/1990 Gillespie
4,940,384 A 7/1990 Amra et al.
4,954,167 A 9/1990 Cooper
4,973,433 A 11/1990 Gilbert et al.
4,986,736 A 1/1991 Kajiwara
4,989,736 A 2/1991 Andersson et al.
5,015,518 A 5/1991 Sasaki et al.
5,025,198 A 6/1991 Mordue et al.
5,028,211 A 7/1991 Mordue et al.
5,029,821 A 7/1991 Bar-on et al.
5,078,572 A 1/1992 Amra et al.
5,080,715 A 1/1992 Provencher et al.
5,088,893 A 2/1992 Gilbert et al.
5,092,821 A 3/1992 Gilbert et al.
5,098,134 A 3/1992 Monckton
5,114,312 A 5/1992 Stanislao
5,126,047 A 6/1992 Martin et al.
5,131,632 A 7/1992 Olson
5,143,357 A 9/1992 Gilbert et al.
5,145,322 A 9/1992 Senior, Jr. et al.
5,152,631 A 10/1992 Bauer
5,154,652 A 10/1992 Ecklesdafer
5,158,440 A 10/1992 Cooper et al.
5,162,858 A 11/1992 Shoji et al.
5,165,858 A 11/1992 Gilbert et al.
5,177,304 A 1/1993 Nagel
5,191,154 A 3/1993 Nagel
5,192,193 A 3/1993 Cooper et al.
5,202,100 A 4/1993 Nagel et al.
5,203,681 A * 4/1993 Cooper ...................... 417/424.1
5,209,641 A 5/1993 Hoglund et al.
5,215,448 A 6/1993 Cooper
5,268,020 A 12/1993 Claxton
5,286,163 A 2/1994 Amra et al.
5,298,233 A 3/1994 Nagel
5,301,620 A 4/1994 Nagel et al.
5,308,045 A 5/1994 Cooper
5,310,412 A 5/1994 Gilbert et al.
5,318,360 A 6/1994 Langer et al.
5,322,547 A 6/1994 Nagel et al.
5,324,341 A 6/1994 Nagel et al.
5,330,328 A * 7/1994 Cooper ...................... 417/424.1
5,354,940 A 10/1994 Nagel
5,358,549 A 10/1994 Nagel et al.
5,358,697 A 10/1994 Nagel
5,364,078 A 11/1994 Pelton
5,369,063 A 11/1994 Gee et al.
5,388,633 A 2/1995 Mercer, II et al.
5,395,405 A 3/1995 Nagel et al.
5,399,074 A 3/1995 Nose et al.
5,407,294 A 4/1995 Giannini
5,411,240 A 5/1995 Rapp et al.
5,425,410 A 6/1995 Reynolds
5,431,551 A 7/1995 Aquino et al.
5,435,982 A 7/1995 Wilkinson
5,436,210 A 7/1995 Wilkinson et al.
5,443,572 A 8/1995 Wilkinson et al.
5,454,423 A 10/1995 Tsuchida et al.
5,468,280 A 11/1995 Areaux
5,470,201 A 11/1995 Gilbert et al.
5,484,265 A 1/1996 Horvath et al.
5,489,734 A 2/1996 Nagel et al.
5,491,279 A 2/1996 Robert et al.
5,495,746 A 3/1996 Sigworth
5,505,143 A 4/1996 Nagel
5,509,791 A 4/1996 Turner
5,537,940 A 7/1996 Nagel et al.
5,543,558 A 8/1996 Nagel et al.
5,555,822 A 9/1996 Loewen et al.
5,558,501 A 9/1996 Wang et al.
5,558,505 A 9/1996 Mordue et al.
5,571,486 A 11/1996 Robert et al.
5,585,532 A 12/1996 Nagel
5,586,863 A 12/1996 Gilbert et al.
5,591,243 A 1/1997 Colussi et al.
5,597,289 A 1/1997 Thut
5,613,245 A 3/1997 Robert
5,616,167 A 4/1997 Eckert
5,622,481 A 4/1997 Thut
5,629,464 A 5/1997 Bach et al.
5,634,770 A 6/1997 Gilbert et al.
5,640,706 A 6/1997 Nagel et al.
5,640,707 A 6/1997 Nagel et al.
5,640,709 A 6/1997 Nagel et al.

| | | | | |
|---|---|---|---|---|
| 5,655,849 | A | 8/1997 | McEwen et al. | |
| 5,662,725 | A | 9/1997 | Cooper | |
| 5,676,520 | A | 10/1997 | Thut | |
| 5,678,244 | A | 10/1997 | Shaw et al. | |
| 5,678,807 | A | 10/1997 | Cooper | |
| 5,679,132 | A | 10/1997 | Rauenzahn et al. | |
| 5,685,701 | A | 11/1997 | Chandler et al. | |
| 5,690,888 | A | 11/1997 | Robert | |
| 5,695,732 | A | 12/1997 | Sparks et al. | |
| 5,716,195 | A | 2/1998 | Thut | |
| 5,717,149 | A | 2/1998 | Nagel et al. | |
| 5,718,416 | A | 2/1998 | Flisakowski et al. | |
| 5,735,668 | A | 4/1998 | Klein | |
| 5,735,935 | A | 4/1998 | Areaux | |
| 5,741,422 | A | 4/1998 | Eichenmiller et al. | |
| 5,744,117 | A | 4/1998 | Wilkinson et al. | |
| 5,745,861 | A | 4/1998 | Bell et al. | |
| 5,772,324 | A | 6/1998 | Falk | |
| 5,776,420 | A | 7/1998 | Nagel | |
| 5,785,494 | A | 7/1998 | Vild et al. | |
| 5,842,832 | A | 12/1998 | Thut | |
| 5,858,059 | A | 1/1999 | Abramovich et al. | |
| 5,863,314 | A | 1/1999 | Morando | |
| 5,866,095 | A | 2/1999 | McGeever et al. | |
| 5,875,385 | A | 2/1999 | Stephenson et al. | |
| 5,935,528 | A | 8/1999 | Stephenson et al. | |
| 5,944,496 | A | 8/1999 | Cooper | |
| 5,947,705 | A | 9/1999 | Mordue et al. | |
| 5,951,243 | A | 9/1999 | Cooper | |
| 5,961,285 | A | 10/1999 | Meneice et al. | |
| 5,963,580 | A | 10/1999 | Eckert | |
| 5,992,230 | A | 11/1999 | Scarpa et al. | |
| 5,993,726 | A | 11/1999 | Huang | |
| 5,993,728 | A | 11/1999 | Vild | |
| 6,019,576 | A | 2/2000 | Thut | |
| 6,027,685 | A | 2/2000 | Cooper | |
| 6,036,745 | A | 3/2000 | Gilbert et al. | |
| 6,074,455 | A | 6/2000 | van Linden et al. | |
| 6,082,965 | A * | 7/2000 | Morando | 415/200 |
| 6,093,000 | A | 7/2000 | Cooper | |
| 6,096,109 | A | 8/2000 | Nagel et al. | |
| 6,113,154 | A | 9/2000 | Thut | |
| 6,123,523 | A | 9/2000 | Cooper | |
| 6,152,691 | A | 11/2000 | Thut | |
| 6,168,753 | B1 * | 1/2001 | Morando | 266/233 |
| 6,187,096 | B1 | 2/2001 | Thut | |
| 6,199,836 | B1 | 3/2001 | Rexford et al. | |
| 6,217,823 | B1 | 4/2001 | Vild et al. | |
| 6,231,639 | B1 | 5/2001 | Eichenmiller | |
| 6,250,881 | B1 | 6/2001 | Mordue et al. | |
| 6,254,340 | B1 | 7/2001 | Vild et al. | |
| 6,270,717 | B1 | 8/2001 | Tremblay et al. | |
| 6,280,157 | B1 | 8/2001 | Cooper | |
| 6,293,759 | B1 | 9/2001 | Thut | |
| 6,303,074 | B1 | 10/2001 | Cooper | |
| 6,345,964 | B1 | 2/2002 | Cooper | |
| 6,354,796 | B1 * | 3/2002 | Morando | 415/121.2 |
| 6,358,467 | B1 | 3/2002 | Mordue | |
| 6,371,723 | B1 | 4/2002 | Grant et al. | |
| 6,398,525 | B1 | 6/2002 | Cooper | |
| 6,439,860 | B1 | 8/2002 | Greer | |
| 6,451,247 | B1 | 9/2002 | Mordue et al. | |
| 6,457,940 | B1 | 10/2002 | Lehman | |
| 6,457,950 | B1 | 10/2002 | Cooper et al. | |
| 6,464,458 | B2 | 10/2002 | Vild et al. | |
| 6,497,559 | B1 | 12/2002 | Grant | |
| 6,500,228 | B1 | 12/2002 | Klingensmith et al. | |
| 6,503,292 | B2 | 1/2003 | Klingensmith et al. | |
| 6,524,066 | B2 | 2/2003 | Thut | |
| 6,533,535 | B2 | 3/2003 | Thut | |
| 6,551,060 | B2 | 4/2003 | Mordue et al. | |
| 6,562,286 | B1 | 5/2003 | Lehman | |
| 6,679,936 | B2 | 1/2004 | Quackenbush | |
| 6,689,310 | B1 | 2/2004 | Cooper | |
| 6,709,234 | B2 | 3/2004 | Gilbert et al. | |
| 6,723,276 | B1 | 4/2004 | Cooper | |
| 6,805,834 | B2 | 10/2004 | Thut | |
| 6,843,640 | B2 | 1/2005 | Mordue et al. | |
| 6,848,497 | B2 | 2/2005 | Sale et al. | |
| 6,869,271 | B2 | 3/2005 | Gilbert et al. | |
| 6,869,564 | B2 | 3/2005 | Gilbert et al. | |
| 6,881,030 | B2 | 4/2005 | Thut | |
| 6,887,424 | B2 | 5/2005 | Ohno et al. | |
| 6,887,425 | B2 | 5/2005 | Mordue et al. | |
| 6,902,696 | B2 | 6/2005 | Klingensmith et al. | |
| 7,083,758 | B2 | 8/2006 | Tremblay | |
| 7,131,482 | B2 | 11/2006 | Vincent et al. | |
| 7,157,043 | B2 | 1/2007 | Neff | |
| 7,279,128 | B2 | 10/2007 | Kennedy et al. | |
| 7,326,028 | B2 | 2/2008 | Morando | |
| 7,402,276 | B2 | 7/2008 | Cooper | |
| 7,470,392 | B2 | 12/2008 | Cooper | |
| 7,476,357 | B2 | 1/2009 | Thut | |
| 7,497,988 | B2 | 3/2009 | Thut | |
| 7,507,367 | B2 | 3/2009 | Cooper | |
| 7,906,068 | B2 * | 3/2011 | Cooper | 266/239 |
| 8,110,141 | B2 | 2/2012 | Cooper | |
| 2001/0000465 | A1 | 4/2001 | Thut | |
| 2002/0185794 | A1 | 12/2002 | Vincent | |
| 2003/0047850 | A1 | 3/2003 | Areaux | |
| 2003/0201583 | A1 | 10/2003 | Killingsmith | |
| 2004/0050525 | A1 | 3/2004 | Kennedy et al. | |
| 2004/0076533 | A1 | 4/2004 | Cooper | |
| 2004/0115079 | A1 | 6/2004 | Cooper | |
| 2004/0262825 | A1 | 12/2004 | Cooper | |
| 2005/0013713 | A1 | 1/2005 | Cooper | |
| 2005/0013714 | A1 | 1/2005 | Cooper | |
| 2005/0013715 | A1 | 1/2005 | Cooper | |
| 2005/0053499 | A1 | 3/2005 | Cooper | |
| 2005/0077730 | A1 | 4/2005 | Thut | |
| 2005/0116398 | A1 | 6/2005 | Tremblay | |
| 2006/0180963 | A1 | 8/2006 | Thut | |
| 2007/0253807 | A1 | 11/2007 | Cooper | |
| 2008/0213111 | A1 | 9/2008 | Cooper | |
| 2008/0230966 | A1 | 9/2008 | Cooper | |
| 2011/0140319 | A1 | 6/2011 | Cooper | |

FOREIGN PATENT DOCUMENTS

| | | |
|---|---|---|
| CA | 2176475 | 5/1996 |
| CA | 2244251 | 12/1996 |
| CA | 2305865 | 2/2000 |
| CH | 392268 | 9/1965 |
| DE | 1800446 | 12/1969 |
| EP | 0168250 | 1/1986 |
| EP | 0665378 | 2/1995 |
| EP | 1019635 | 6/2006 |
| GB | 942648 | 11/1963 |
| GB | 1185314 | 3/1970 |
| GB | 2217784 | 3/1989 |
| JP | 58048796 | 3/1983 |
| JP | 63104773 | 5/1988 |
| MX | 227385 | 4/2005 |
| NO | 90756 | 1/1956 |
| RU | 416401 | 2/1974 |
| RU | 773312 | 10/1980 |
| WO | 9808990 | 3/1998 |
| WO | 9825031 | 11/1998 |
| WO | 0009889 | 2/2000 |
| WO | 0212147 | 2/2002 |

OTHER PUBLICATIONS

USPTO; Notice of Allowance dated Nov. 1, 2011 in U.S. Appl. No. 12/146,770.

USPTO; Final Office Action dated Nov. 4, 2011 in U.S. Appl. No. 12/264,416.

USPTO; Final Office Action dated Dec. 13, 2011 in U.S. Appl. No. 12/395,430.

USPTO; Final Office Action dated Dec. 16, 2011 in U.S. Appl. No. 13/047,719.

"Response to Final Office Action and Request for Continued Examination for U.S. Appl. No. 09/275,627," Including Declarations of Haynes and Johnson, Apr. 16, 2001.

Document No. 504217: Excerpts from "Pyrotek Inc.'s Motion for Summary Judgment of Invalidity and Unenforceability of U.S. Patent No. 7,402,276," Oct. 2, 2009.

Document No. 505026: Excerpts from "MMEI's Response to Pyrotek's Motion for Summary Judgment of Invalidity or Enforceability of U.S. Patent No. 7,402,276," Oct. 9, 2009.
Document No. 507689: Excerpts from "MMEI's Pre-Hearing Brief and Supplemental Motion for Summary Judgment of Infringement of Claims 3-4, 15, 17-20, 26 and 28-29 of the '074 Patent and Motion for Reconsideration of the Validity of Claims 7-9 of the '276 Patent," Nov. 4, 2009.
Document No. 517158: Excerpts from "Reasoned Award," Feb. 19, 2010.
Document No. 525055: Excerpts from "Molten Metal Equipment Innovations, Inc.'s Reply Brief in Support of Application to Confirm Arbitration Award and Opposition to Motion to Vacate," May 12, 2010.
USPTO; Office Action dated Nov. 15, 2007 in U.S. Appl. No. 10/773,101.
USPTO; Office Action dated Mar. 16, 2005 in U.S. Appl. No. 10/827,941.
USPTO; Final Office Action dated Nov. 7, 2005 in U.S. Appl. No. 10/827,941.
USPTO; Office Action dated Jul. 12, 2006 in U.S. Appl. No. 10/827,941.
USPTO; Final Office Action dated Mar. 8, 2007 in U.S. Appl. No. 10/827,941.
USPTO; Office Action dated Oct. 29, 2007 in U.S. Appl. No. 10/827,941.
USPTO; Office Action dated Sep. 26, 2008 in U.S. Appl. No. 11/413,982.
USPTO; Final Office Action dated Oct. 14, 2008 in U.S. Appl. No. 12/111,835.
USPTO; Office Action dated May 15, 2009 in U.S. Appl. No. 12/111,835.
USPTO; Office Action dated Nov. 3, 2008 in U.S. Appl. No. 12/120,200.
USPTO; Final Office Action dated May 28, 2009 in U.S. Appl. No. 12/120,200.
USPTO; Office Action dated Dec. 18, 2009 in U.S. Appl. No. 12/120,200.
USPTO; Final Office Action dated Jul. 9, 2010 in U.S. Appl. No. 12/120,200.
USPTO; Office Action dated Jan. 21, 2011 in U.S. Appl. No. 12/120,200.
USPTO; Final Office Action dated Jul. 26, 2011 in U.S. Appl. No. 12/120,200.
USPTO; Office Action dated Mar. 31, 2009 in U.S. Appl. No. 12/120,190.
USPTO; Final Office Action dated Dec. 4, 2009 in U.S. Appl. No. 12/120,190.
USPTO; Office Action dated Jun. 28, 2010 in U.S. Appl. No. 12/120,190.
USPTO; Final Office Action dated Jan. 6, 2011 in U.S. Appl. No. 12/120,190.
USPTO; Office Action dated Jun. 27, 2011 in U.S. Appl. No. 12/120,190.
USPTO; Office Action dated Apr. 13, 2009 in U.S. Appl. No. 12/264,416.
USPTO; Final Office Action dated Oct. 8, 2009 in U.S. Appl. No. 12/264,416.
USPTO; Office Action dated Feb. 1, 2010 in U.S. Appl. No. 12/264,416.
USPTO; Final Office Action dated Jun. 30, 2010 in U.S. Appl. No. 12/264,416.
USPTO; Office Action dated Mar. 17, 2011 in U.S. Appl. No. 12/264,416.
USPTO; Final Office Action dated Jul. 7, 2011 in U.S. Appl. No. 12/264,416.
USPTO; Office Action dated Apr. 27, 2009 in U.S. Appl. No. 12/146,788.
USPTO; Final Office Action dated Oct. 15, 2009 in U.S. Appl. No. 12/146,788.
USPTO; Office Action dated Feb. 16, 2010 in U.S. Appl. No. 12/146,788.
USPTO; Final Office Action dated Jul. 13, 2010 in U.S. Appl. No. 12/146,788.
USPTO; Office Action dated Apr. 19, 2011 in U.S. Appl. No. 12/146,788.
USPTO; Notice of Allowance dated Aug. 19, 2011 in U.S. Appl. No. 12/146,788.
USPTO; Office Action dated May 22, 2009 in U.S. Appl. No. 12/369,362.
USPTO; Final Office Action dated Dec. 14, 2009 in U.S. Appl. No. 12/369,362.
USPTO; Office Action dated Jun. 16, 2009 in U.S. Appl. No. 12/146,770.
USPTO; Final Office Action dated Feb. 24, 2010 in U.S. Appl. No. 12/146,770.
USPTO; Office Action dated Jun. 9, 2010 in U.S. Appl. No. 12/146,770.
USPTO; Office Action dated Nov. 18, 2010 in U.S. Appl. No. 12/146,770.
USPTO; Final Office Action dated Apr. 4, 2011 in U.S. Appl. No. 12/146,770.
USPTO; Notice of Allowance dated Aug. 22, 2011 in U.S. Appl. No. 12/146,770.
USPTO; Office Action dated Dec. 11, 2009 in U.S. Appl. No. 11/766,617.
USPTO; Office Action dated Mar. 8, 2010 in U.S. Appl. No. 11/766,617.
USPTO; Final Office Action dated Sep. 20, 2010 in U.S. Appl. No. 11/766,617.
USPTO; Office Action dated Mar. 1, 2011 in U.S. Appl. No. 11/766,617.
USPTO; Final Office Action dated Sep. 22, 2011 in U.S. Appl. No. 11/766,617.
USPTO; Final Office Action dated Jun. 11, 2010 in U.S. Appl. No. 12/395,430.
USPTO; Office Action dated Nov. 24, 2010 in U.S. Appl. No. 12/395,430.
USPTO; Final Office Action dated Apr. 6, 2011 in U.S. Appl. No. 12/395,430.
USPTO; Office Action dated Aug. 18, 2011 in U.S. Appl. No. 12/395,430.
USPTO; Office Action dated Sep. 29, 2010 in U.S. Appl. No. 12/758,509.
USPTO; Final Office Action dated May 11, 2011 in U.S. Appl. No. 12/758,509.
USPTO; Office Action dated Sep. 22, 2011 in U.S. Appl. No. 12/880,027.
USPTO; Office Action dated Aug. 25, 2011 in U.S. Appl. No. 13/047,719.
USPTO; Office Action dated Aug. 27, 2001 in U.S. Appl. No. 90/005,910.
CIPO; Office Action dated Dec. 4, 2001 in Application No. 2,115,929.
CIPO; Office Action dated Apr. 22, 2002 in Application No. 2,115,929.
CIPO; Notice of Allowance dated Jul. 18, 2003 in Application No. 2,115,929.
CIPO; Office Action dated Jun. 30, 2003 in Application No. 2,176,475.
CIPO; Notice of Allowance dated Sep. 15, 2004 in Application No. 2,176,475.
CIPO; Office Action dated May 29, 2000 in Application No. 2,242,174.
CIPO; Office Action dated Feb. 22, 2006 in Application No. 2,244,251.
CIPO; Office Action dated Mar. 27, 2007 in Application No. 2,244,251.
CIPO; Notice of Allowance dated Jan. 15, 200 in Application No. 2,244,251.
CIPO; Office Action dated Sep. 18, 2002 in Application No. 2,305,865.
CIPO; Notice of Allowance dated May 2, 2003 in Application No. 2,305,865.

EPO; Examination Report dated Oct. 6, 2008 in Application No. 08158682.
EPO; Office Action dated Jan. 26, 2010 in Application No. 08158682.
EPO; Office Action dated Feb. 15, 2011 in Application No. 08158682.
EPO; Search Report dated Nov. 9, 1998 in Application No. 98112356.
EPO; Office Action dated Feb. 6, 2003 in Application No. 99941032.
EPO; Office Action dated Aug. 20, 2004 in Application No. 99941032.
PCT; International Search Report or Declaration dated Nov. 15, 1999 in Application No. PCT/US1999/18178.
PCT; International Search Report or Declaration dated Oct. 9, 1998 in Application No. PCT/US1999/22440.
USPTO; Office Action dated Feb. 23, 1996 in U.S. Appl. No. 08/439,739.
USPTO; Office Action dated Aug. 15, 1996 in U.S. Appl. No. 08/439,739.
USPTO; Advisory Action dated Nov. 18, 1996 in U.S. Appl. No. 08/439,739.
USPTO; Advisory Action dated Dec. 9, 1996 in U.S. Appl. No. 08/439,739.
USPTO; Notice of Allowance dated Jan. 17, 1997 in U.S. Appl. No. 08/439,739.
USPTO; Office Action dated Jul. 22, 1996 in U.S. Appl. No. 08/489,962.
USPTO; Office Action dated Jan. 6, 1997 in U.S. Appl. No. 08/489,962.
USPTO; Interview Summary dated Mar. 4, 1997 in U.S. Appl. No. 08/489,962.
USPTO; Notice of Allowance dated Mar. 27, 1997 in U.S. Appl. No. 08/489,962.
USPTO; Office Action dated Sep. 23, 1998 in U.S. Appl. No. 08/759,780.
USPTO; Interview Summary dated Dec. 30, 1998 in U.S. Appl. No. 08/789,780.
USPTO; Notice of Allowance dated Mar. 17, 1999 in U.S. Appl. No. 08/789,780.
USPTO; Office Action dated Jul. 23, 1998 in U.S. Appl. No. 08/889,882.
USPTO; Office Action dated Jan. 21, 1999 in U.S. Appl. No. 08/889,882.
USPTO; Notice of Allowance dated Mar. 17, 1999 in U.S. Appl. No. 08/889,882.
USPTO; Office Action dated Feb. 26, 1999 in U.S. Appl. No. 08/951,007.
USPTO; Interview Summary dated Mar. 15, 1999 in U.S. Appl. No. 08/951,007.
USPTO; Office Action dated May 17, 1999 in U.S. Appl. No. 08/951,007.
USPTO; Notice of Allowance dated Aug. 27, 1999 in U.S. Appl. No. 08/951,007.
USPTO; Office Action dated Dec. 23, 1999 in U.S. Appl. No. 09/132,934.
USPTO; Notice of Allowance dated Mar. 9, 2000 in U.S. Appl. No. 09/132,934.
USPTO; Office Action dated Jan. 7, 2000 in U.S. Appl. No. 09/152,168.
USPTO; Notice of Allowance dated Aug. 7, 2000 in U.S. Appl. No. 09/152,168.
USPTO; Office Action dated Sep. 29, 1999 in U.S. Appl. No. 09/275,627.
USPTO; Office Action dated May 22, 2000 in U.S. Appl. No. 09/275,627.
USPTO; Office Action dated Nov. 14, 2000 in U.S. Appl. No. 09/275,627.
USPTO; Office Action dated May 21, 2001 in U.S. Appl. No. 09/275,627.
USPTO; Notice of Allowance dated Aug. 31, 2001 in U.S. Appl. No. 09/275,627.
USPTO; Office Action dated Jun. 15, 2000 in U.S. Appl. No. 09/312,361.
USPTO; Notice of Allowance dated Jan. 29, 2001 in U.S. Appl. No. 09/312,361.
USPTO; Office Action dated Jun. 22, 2001 in U.S. Appl. No. 09/569,461.
USPTO; Office Action dated Oct. 12, 2001 in U.S. Appl. No. 09/569,461.
USPTO; Office Action dated May 3, 2002 in U.S. Appl. No. 09/569,461.
USPTO; Advisory Action dated May 14, 2002 in U.S. Appl. No. 09/569,461.
USPTO; Office Action dated Dec. 4, 2002 in U.S. Appl. No. 09/569,461.
USPTO; Interview Summary dated Jan. 14, 2003 in U.S. Appl. No. 09/569,461.
USPTO; Notice of Allowance dated Jun. 24, 2003 in U.S. Appl. No. 09/569,461.
USPTO; Office Action dated Nov. 21, 2000 in U.S. Appl. No. 09/590,108.
USPTO; Office Action dated May 22, 2001 in U.S. Appl. No. 09/590,108.
USPTO; Notice of Allowance dated Sep. 10, 2001 in U.S. Appl. No. 09/590,108.
USPTO; Office Action dated Jan. 30, 2002 in U.S. Appl. No. 09/649,190.
USPTO; Office Action dated Oct. 4, 2002 in U.S. Appl. No. 09/649,190.
USPTO; Office Action dated Apr. 18, 2003 in U.S. Appl. No. 09/649,190.
USPTO; Notice of Allowance dated Nov. 21, 2003 in U.S. Appl. No. 09/649,190.
USPTO; Office Action dated Jun. 7, 2006 in U.S. Appl. No. 10/619,405.
USPTO; Final Office Action dated Feb. 20, 2007 in U.S. Appl. No. 10/619,405.
USPTO; Office Action dated Oct. 9, 2007 in U.S. Appl. No. 10/619,405.
USPTO; Final Office Action dated May 29, 2008 in U.S. Appl. No. 10/619,405.
USPTO; Interview Summary Aug. 22, 2008 in U.S. Appl. No. 10/619,405.
USPTO; Ex Parte Quayle dated Sep. 12, 2008 in U.S. Appl. No. 10/619,405.
USPTO; Interview Summary dated Oct. 16, 2008 in U.S. Appl. No. 10/619,405.
USPTO; Notice of Allowance dated Nov. 14, 2008 in U.S. Appl. No. 10/619,405.
USPTO; Office Action dated Mar. 20, 2006 in U.S. Appl. No. 10/620,318.
USPTO; Office Action dated Nov. 16, 2006 in U.S. Appl. No. 10/620,318.
USPTO; Final Office Action dated Jul. 25, 2007 in U.S. Appl. No. 10/620,318.
USPTO; Office Action dated Feb. 12, 2008 in U.S. Appl. No. 10/620,318.
USPTO; Final Office Action dated Oct. 16, 2008 in U.S. Appl. No. 10/620,318.
USPTO; Office Action dated Feb. 25, 2009 in U.S. Appl. No. 10/620,318.
USPTO; Final Office Action dated Oct. 8, 2009 in U.S. Appl. No. 10/620,318.
USPTO; Notice of Allowance Jan. 26, 2010 in U.S. Appl. No. 10/620,318.
USPTO; Office Action dated Jun. 27, 2006 in U.S. Appl. No. 10/773,102.
USPTO; Office Action dated Mar. 6, 2007 in U.S. Appl. No. 10/773,102.
USPTO; Office Action dated Oct. 11, 2007 in U.S. Appl. No. 10/773,102.
USPTO; Interview Summary dated Mar. 18, 2008 in U.S. Appl. No. 10/773,102.
USPTO; Notice of Allowance Apr. 18, 2008 in U.S. Appl. No. 10/773,102.

USPTO; Office Action dated Jul. 24, 2006 in U.S. Appl. No. 10/773,105.
USPTO; Final Office Action dated Jul. 21, 2007 in U.S. Appl. No. 10/773,105.
USPTO; Office Action dated Oct. 9, 2007 in U.S. Appl. No. 10/773,105.
USPTO; Interview Summary dated Jan. 25, 2008 in U.S. Appl. No. 10/773,105.
USPTO; Office Action dated May 19, 2008 in U.S. Appl. No. 10/773,105.
USPTO; Interview Summary dated Jul. 21, 2008 in U.S. Appl. No. 10/773,105.
USPTO; Notice of Allowance dated Sep. 29, 2008 in U.S. Appl. No. 10/773,105.
USPTO; Office Action dated Jan. 31, 2008 in U.S. Appl. No. 10/773,118.
USPTO; Final Office Action dated Aug. 18, 2008 in U.S. Appl. No. 10/773,118.
USPTO; Interview Summary dated Oct. 16, 2008 in U.S. Appl. No. 10/773,118.
USPTO; Office Action dated Dec. 15, 2008 in U.S. Appl. No. 10/773,118.
USPTO; Final Office Action dated May 1, 2009 in U.S. Appl. No. 10/773,118.
USPTO; Office Action dated Jul. 27, 2009 in U.S. Appl. No. 10/773,118.
USPTO; Final Office Action dated Feb. 2, 2010 in U.S. Appl. No. 10/773,118.
USPTO; Interview Summary dated Jun. 4, 2010 in U.S. Appl. No. 10/773,118.
USPTO; Ex Parte Quayle Action dated Aug. 25, 2010 in U.S. Appl. No. 10/773,118.
USPTO; Notice of Allowance dated Nov. 5, 2010 in U.S. Appl. No. 10/773,118.
USPTO; Office Action dated Jan. 27, 2012 in U.S. Appl. No. 11/766,617.
USPTO; Notice of Allowance dated May 15, 2012 in U.S. Appl. No. 11/766,617.
USPTO; Notice of Allowance dated Feb. 6, 2012 in U.S. Appl. No. 12/120,190.
USPTO; Final Office Action dated Feb. 3, 2012 in U.S. Appl. No. 12/120,200.
USPTO; Final Office Action dated Jun. 8, 2012 in U.S. Appl. No. 12/264,416.
USPTO; Advisory Action dated Feb. 22, 2012 in U.S. Appl. No. 12/395,430.
USPTO; Office Action dated Feb. 1, 2012 in U.S. Appl. No. 12/853,201.
USPTO; Final Office Action dated Jul. 3, 2012 in U.S. Appl. No. 12/853,201.
USPTO; Office Action dated Feb. 27, 2012 in U.S. Appl. No. 12/853,253.
USPTO; Ex Parte Quayle Action dated Jun. 27, 2012 in U.S. Appl. No. 12/853,253.
USPTO; Office Action dated Mar. 12, 2012 in U.S. Appl. No. 12/853,255.
USPTO; Office Action dated May 29, 2012 in U.S. Appl. No. 12/878,984.
USPTO; Office Action dated Apr. 19, 2012 in U.S. Appl. No. 12/853,268.
USPTO; Final Office Action dated Feb. 16, 2012 in U.S. Appl. No. 12/880,027.
USPTO; Office Action dated Apr. 18, 2012 in U.S. Appl. No. 13/252,145.
CIPO; Notice of Allowance dated Jan. 15, 2008 in Application No. 2,244,251.

* cited by examiner

SUPPORT POSTS FOR MOLTEN METAL PUMPS

CROSS-REFERENCE TO RELATED APPLICATIONS

This Application is a divisional of and claims priority to U.S. patent application Ser. No. 10/773,118, filed Feb. 4, 2004 now U.S. Pat. No. 7,906,068, and entitled Support Post System for Molten Metal Pump, to Paul V. Cooper.

FIELD OF THE INVENTION

The invention relates to a clamp that may be used with a molten metal pump to secure a support post to a superstructure of the pump, and a support post that may be used with the clamp.

BACKGROUND OF THE INVENTION

As used herein, the term "molten metal" means any metal or combination of metals in liquid form, such as aluminum, copper, iron, zinc and alloys thereof. The term "gas" means any gas or combination of gases, including argon, nitrogen, chlorine, fluorine, freon, and helium, which are released into molten metal.

Known pumps for pumping molten metal (also called "molten-metal pumps") include a pump base (also called a housing or casing), one or more inlets to allow molten metal to enter a pump chamber (an inlet is usually an opening in the pump base that communicates with the pump chamber), a pump chamber, which is an open area formed within the pump base, and a discharge, which is a channel or conduit communicating with the pump chamber (in an axial pump the pump chamber and discharge may be the same structure or different areas of the same structure) leading from the pump chamber to the molten metal bath in which the pump base is submerged. A rotor, also called an impeller, is mounted in the pump chamber and is connected to a drive shaft. The drive shaft is typically a motor shaft coupled to a rotor shaft, wherein the motor shaft has two ends, one end being connected to a motor and the other end being coupled to the rotor shaft. The rotor shaft also has two ends, wherein one end is coupled to the motor shaft and the other end is connected to the rotor. Often, the rotor shaft is comprised of graphite, the motor shaft is comprised of steel, and these two shafts are coupled by a coupling, which is usually comprised of steel.

As the motor turns the drive shaft, the drive shaft turns the rotor and the rotor pushes molten metal out of the pump chamber, through the discharge, which may be an axial or tangential discharge, and into the molten metal bath. Most molten metal pumps are gravity fed, wherein gravity forces molten metal through the inlet and into the pump chamber as the rotor pushes molten metal out of the pump chamber.

Molten metal pump casings and rotors usually employ a bearing system comprising ceramic rings wherein there are one or more rings on the rotor that align with rings in the pump chamber (such as rings at the inlet (which is usually the top of the pump chamber and bottom of the pump chamber) when the rotor is placed in the pump chamber. The purpose of the bearing system is to reduce damage to the soft, graphite components, particularly the rotor and pump chamber wall, during pump operation. A known bearing system is described in U.S. Pat. No. 5,203,681 to Cooper, the disclosure of which is incorporated herein by reference. As discussed in U.S. Pat. Nos. 5,591,243 and 6,093,000, each to Cooper, the disclosures of which are incorporated herein by reference, bearing rings can cause various operational and shipping problems and U.S. Pat. No. 6,093,000 discloses rigid coupling designs and a monolithic rotor to help alleviate this problem. Further, U.S. Pat. No. 2,948,524 to Sweeney et al., U.S. Pat. No. 4,169,584 to Mangalick, U.S. Pat. No. 5,203,681 to Cooper and U.S. Pat. No. 6,123,523 to Cooper (the disclosures of the aforementioned patents to Cooper, insofar as such disclosures are not inconsistent with the teachings of this application, are incorporated herein by reference) all disclose molten metal pumps. Furthermore, U.S. patent application Ser. No. 10/773,102, which is now U.S. Pat. No. 7,402,276, filed on Feb. 4, 2004 and entitled "Pump With Rotating Inlet" discloses, among other things, a pump having an inlet and rotor structure (or other displacement structure) that rotate together as the pump operates in order to alleviate jamming. The disclosure of this patent, insofar as such disclosures are not inconsistent with the teachings of this application, is incorporated herein by reference.

The materials forming the components that contact the molten metal bath should remain relatively stable in the bath. Structural refractory materials, such as graphite or ceramics, that are resistant to disintegration by corrosive attack from the molten metal may be used. As used herein "ceramics" or "ceramic" refers to any oxidized metal (including silicon) or carbon-based material, excluding graphite, capable of being used in the environment of a molten metal bath. "Graphite" means any type of graphite, whether or not chemically treated. Graphite is particularly suitable for being formed into pump components because it is (a) soft and relatively easy to machine, (b) not as brittle as ceramics and less prone to breakage, and (c) less expensive than ceramics.

Three basic types of pumps for pumping molten metal, such as molten aluminum, are utilized: circulation pumps, transfer pumps and gas-release pumps. Circulation pumps are used to circulate the molten metal within a bath, thereby generally equalizing the temperature of the molten metal. Most often, circulation pumps are used in a reverbatory furnace having an external well. The well is usually an extension of a charging well where scrap metal is charged (i.e., added).

Transfer pumps are generally used to transfer molten metal from the external well of a reverbatory furnace to a different location such as a ladle or another furnace. Examples of transfer pumps are disclosed in U.S. Pat. No. 6,345,964 B1 to Cooper, the disclosure of which, insofar as such disclosures are not inconsistent with the teachings of this application, is incorporated herein by reference, and U.S. Pat. No. 5,203,681.

Gas-release pumps, such as gas-injection pumps, circulate molten metal while releasing a gas into the molten metal. In the purification of molten metals, particularly aluminum, it is frequently desired to remove dissolved gases such as hydrogen, or dissolved metals, such as magnesium, from the molten metal. As is known by those skilled in the art, the removing of dissolved gas is known as "degassing" while the removal of magnesium is known as "demagging." Gas-release pumps may be used for either of these purposes or for any other application for which it is desirable to introduce gas into molten metal. Gas-release pumps generally include a gas-transfer conduit having a first end that is connected to a gas source and a second submerged in the molten metal bath. Gas is introduced into the first end and is released from the second end into the molten metal. The gas may be released downstream of the pump chamber into either the pump discharge or a metal-transfer conduit extending from the discharge, or into a stream of molten metal exiting either the discharge or the metal-transfer conduit. Alternatively, gas may be released into the pump chamber or upstream of the pump chamber at a position where it enters the pump chamber. A system for releasing gas into a pump chamber is disclosed in U.S. Pat. No. 6,123,523 to Cooper. Another gas-release pump is disclosed in a co-pending U.S. patent application filed on Feb. 4, 2004 and entitled "Gas-Release System for Molten Metal Pump" to Paul V. Cooper, the disclosure of which that is not inconsistent with the teachings of this application is incorporated herein by reference.

A problem with known pumps is that that they include a superstructure that is positioned above the molten metal bath when the pump is in use. The pump motor, among other things, rests upon the superstructure. The superstructure is positioned above the molten metal bath by one or more support posts connected to the pump base. The support posts must, therefore, be attached to the superstructure to support it, and if more than one support post is used, each must maintain the superstructure at about the same height relative the pump base in order to keep the superstructure level. Each support post is attached to the superstructure by a post clamp that typically has a portion (such as a flange) that connects to the superstructure and another portion that connects to the support post.

The primary methods of locating and connecting each support post to the superstructure at the same relative height have been to machine a groove or hole in each post at the same location. If a groove is formed, it is formed in the outer surface of the support post, and the groove mates with a corresponding lip on a support post clamp. The clamp also includes a lower flange that connects to the superstructure and the flange and the lip support the weight of the superstructure. Such a system is shown in U.S. Pat. No. 5,203,681.

Another known method for locating a support post relative a superstructure is by the use of a through-bolt hole. Utilizing this system, a hole, or bore, is drilled through each support post at the same location on each post. A cylindrical, preferably two-piece post clamp having an aperture formed on either side, receives an end of the support post and a bolt is passed through the apertures and a bore (also called a through bolt hole) in the support post. Lower flanges on the post clamp are connected to the superstructure and the bore in the support post supports the weight of the superstructure. Such a system is shown in U.S. Pat. No. 5,203,681.

A problem with these known methods of connecting a support post to a superstructure is the time required to precisely locate and machine the grooves or through bolt holes at the same location on each support post so that the superstructure is level when the pump is used. Another problem is that the weight of the superstructure is supported by grooves or bores in the support posts, which are usually made of relatively soft graphite. Supporting the weight of the superstructure in this manner can cause the support posts to crack or break.

SUMMARY OF THE INVENTION

The present invention solves these and other problems by providing a support post clamp that supports the weight of a pump superstructure on the top of the support posts. The clamp includes (a) a bottom flange for connecting to the pump superstructure, (b) a cavity for receiving an end of a support post, wherein the end has a top surface, and (c) a top flange for being positioned above the top surface.

The clamp is preferably a two-piece clamp wherein each piece has a bottom flange for attaching to the superstructure and an upper flange for being positioned above the top surface of a support post. When the clamp is mounted to the superstructure, a cavity is formed between the two pieces. The cavity is dimensioned to receive an end of a support post. When in use, the top end of a support post is received in the cavity, and the superstructure is supported by the top surface of the end of the support post. It is preferred that a plurality of support posts (most preferably three) be used, in which case the superstructure is supported in part by each top surface of each support post. Because the height of the support posts, rather than the position of a groove or through bolt hole, determines the height of the superstructure relative the pump base, if more than one support post is used, they must be of substantially the same height.

DETAILED DESCRIPTION OF A PREFERRED EMBODIMENT

Figure 1:
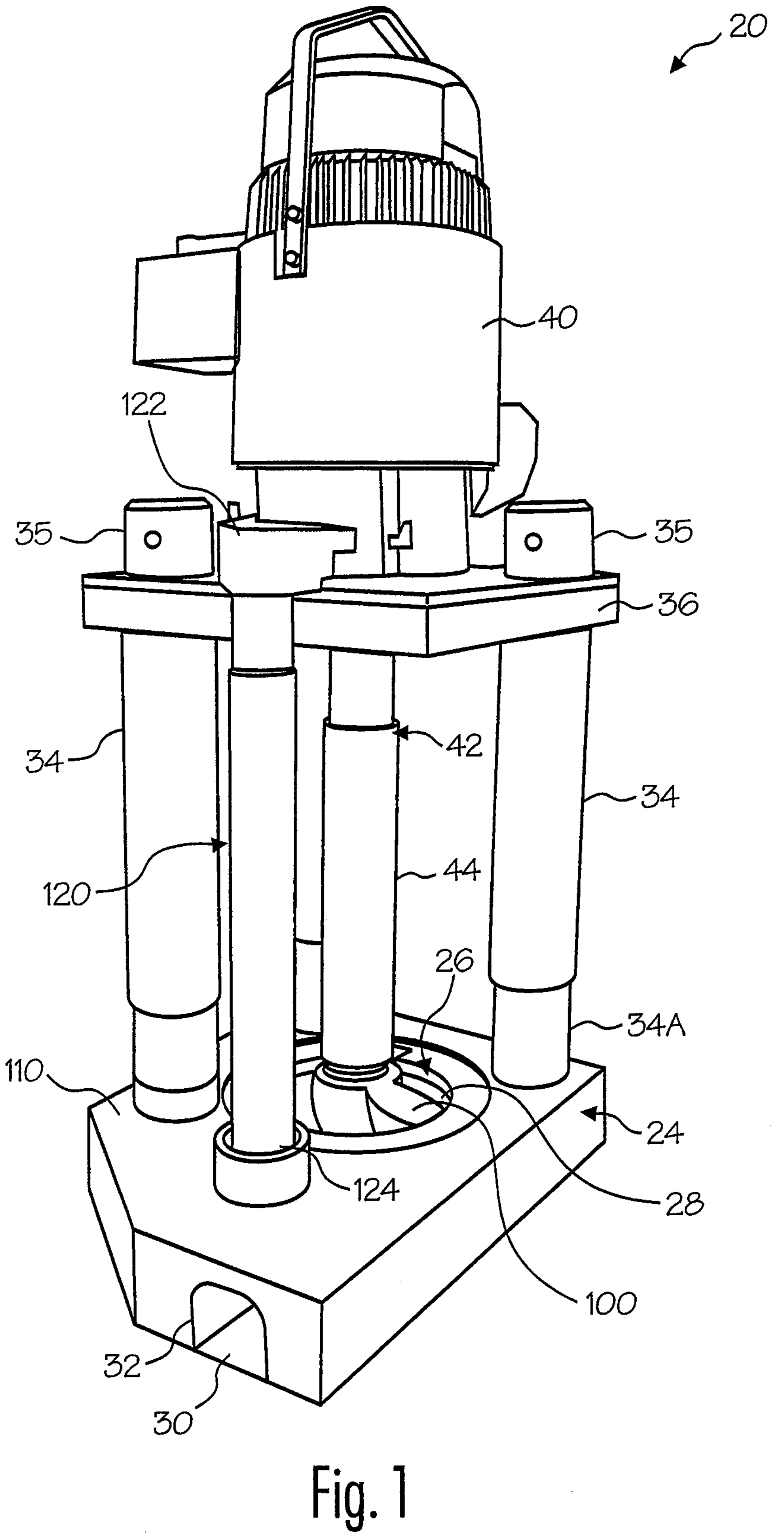
FIG. 1 is a perspective view of a pump for pumping molten metal, which includes a plurality of post clamps and support posts according to the invention.

Referring now to the drawing where the purpose is to illustrate and describe different embodiments of the invention, and not to limit same, FIG. 1 shows a molten metal pump. During operation, Pump 20 is usually positioned in a molten metal bath B in a pump well, which is normally part of the open well of a reverbatory furnace.

The components of pump 20 that are exposed to the molten metal are preferably formed of structural refractory materials, which are resistant to degradation in the molten metal. Carbonaceous refractory materials, such as carbon of a dense or structural type, including graphite, graphitized carbon, clay-bonded graphite, carbon-bonded graphite, or the like have all been found to be most suitable because of cost and ease of machining. Such components may be made by mixing ground graphite with a fine clay binder, forming the non-coated component and baking, and may be glazed or unglazed. In addition, components made of carbonaceous refractory materials may be treated with one or more chemicals to make the components more resistant to oxidation. Oxidation and erosion treatments for graphite parts are practiced commercially, and graphite so treated can be obtained from sources known to those skilled in the art.

Pump 20 can be any structure or device for pumping or otherwise conveying molten metal, such as one of the pumps disclosed in U.S. Pat. No. 5,203,681 to Cooper, copending U.S. patent application to Cooper entitled "Pump with Rotating Inlet" or copending U.S. patent application to Cooper entitled "System for Releasing Gas Into Molten Metal." The invention could also use an axial pump having an axial, rather than tangential, discharge. Preferred pump 20 has a pump base 24 for being submersed in a molten metal bath. Pump base 24 preferably includes a generally nonvolute pump chamber 26, such as a cylindrical pump chamber or what has been called a "cut" volute, although pump base 24 may have any shape pump chamber suitable of being used, including a volute-shaped chamber. Chamber 26 may be constructed to have only one opening, either in its top or bottom, if a tangential discharge is used, since only one opening is required to introduce molten metal into pump chamber 26. Generally, pump chamber 24 has two coaxial openings of the same diameter and usually one is blocked by a flow blocking plate mounted on the bottom of, or formed as part of, a device or rotor 100. (In the context of this application, "rotor" refers to any rotor that may be used to displace molten metal, and includes a device having a rotating inlet structure).

A motor 40, which can be any structure, system or device suitable for driving pump 20, but is preferably an electric or pneumatic motor, is positioned on superstructure 36 and is connected to an end of a drive shaft 42. A drive shaft 42 can be any structure suitable for rotating an impeller, and preferably comprises a motor shaft (not shown) coupled to a rotor shaft. The motor shaft has a first end and a second end, wherein the first end of the motor shaft connects to motor 40 and the second end of the motor shaft connects to the coupling. Rotor shaft 44 has a first end and a second end, wherein the first end is connected to the coupling and the second end is connected to device 100 or to an impeller according to the invention.

The preferred rotor is device 100 as disclosed in an application entitled "Pump with Rotating Inlet," invented by Paul V. Cooper, the disclosure of which was previously incorporated herein by reference. A preferred coupling, rotor shaft and connection between the rotor shaft and device 100, and various pump components that may be used with a pump according to the invention are disclosed in U.S. application Ser. No. 10/773,105, filed on Feb. 4, 2004 and entitled "Molten Metal Pump Components," invented by Paul V. Cooper, which is now U.S. Pat. No. 7,470,392.

Figure 1A:
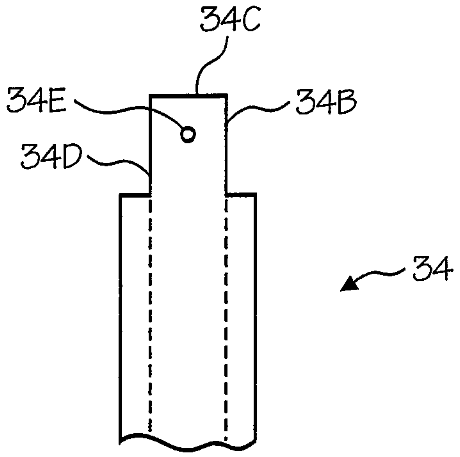
FIG. 1A is a partial side view of a support post that can be used with the invention.
Figure 1B:
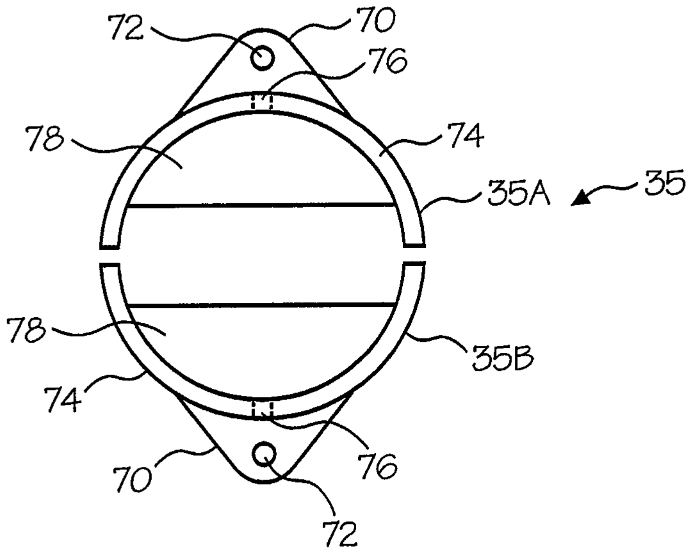
FIG. 1B is a top view of a post clamp according to the inventor.
Figure 2:
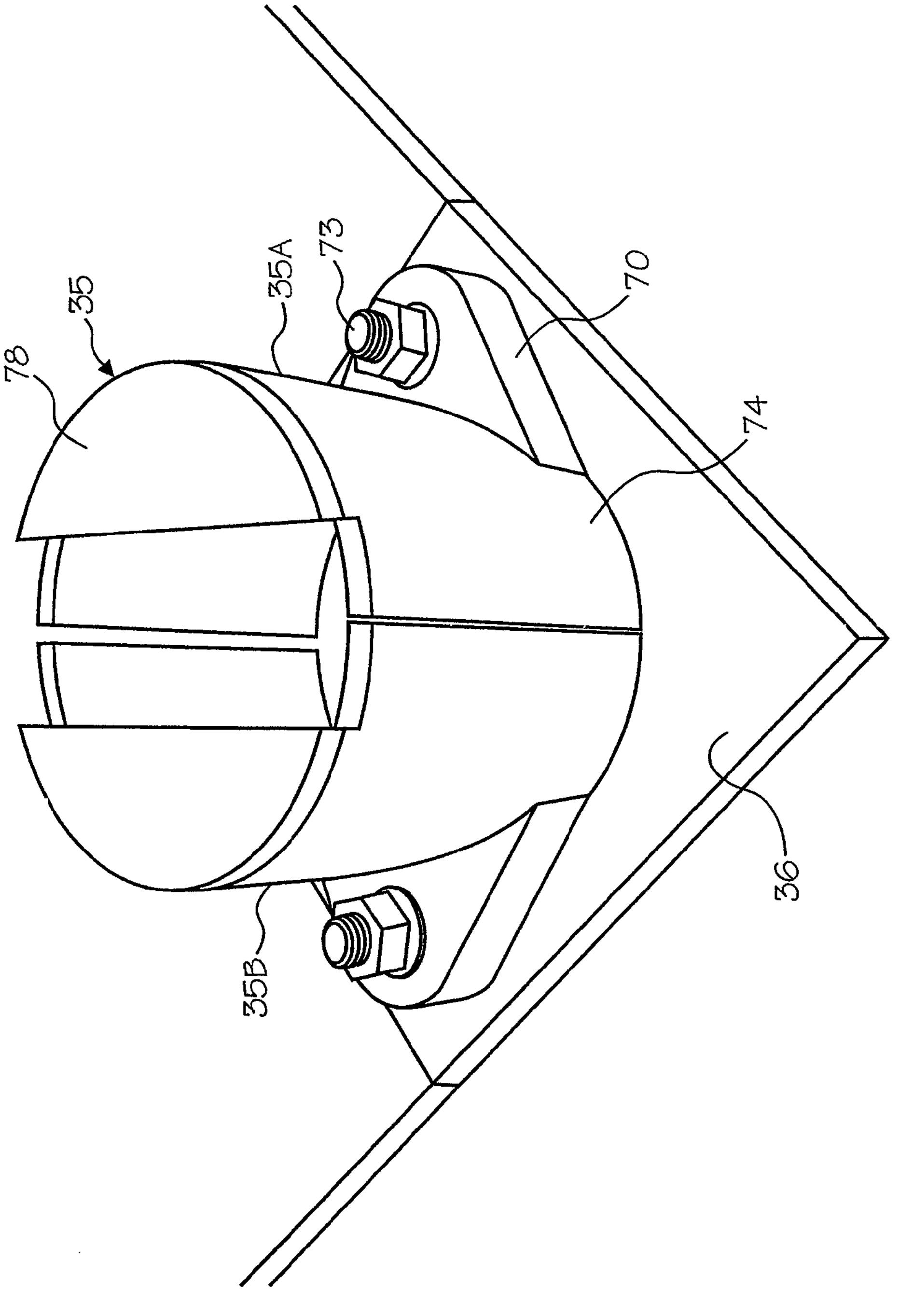
FIG. 2 is a perspective view of a post clamp according to the invention.
Figure 3:
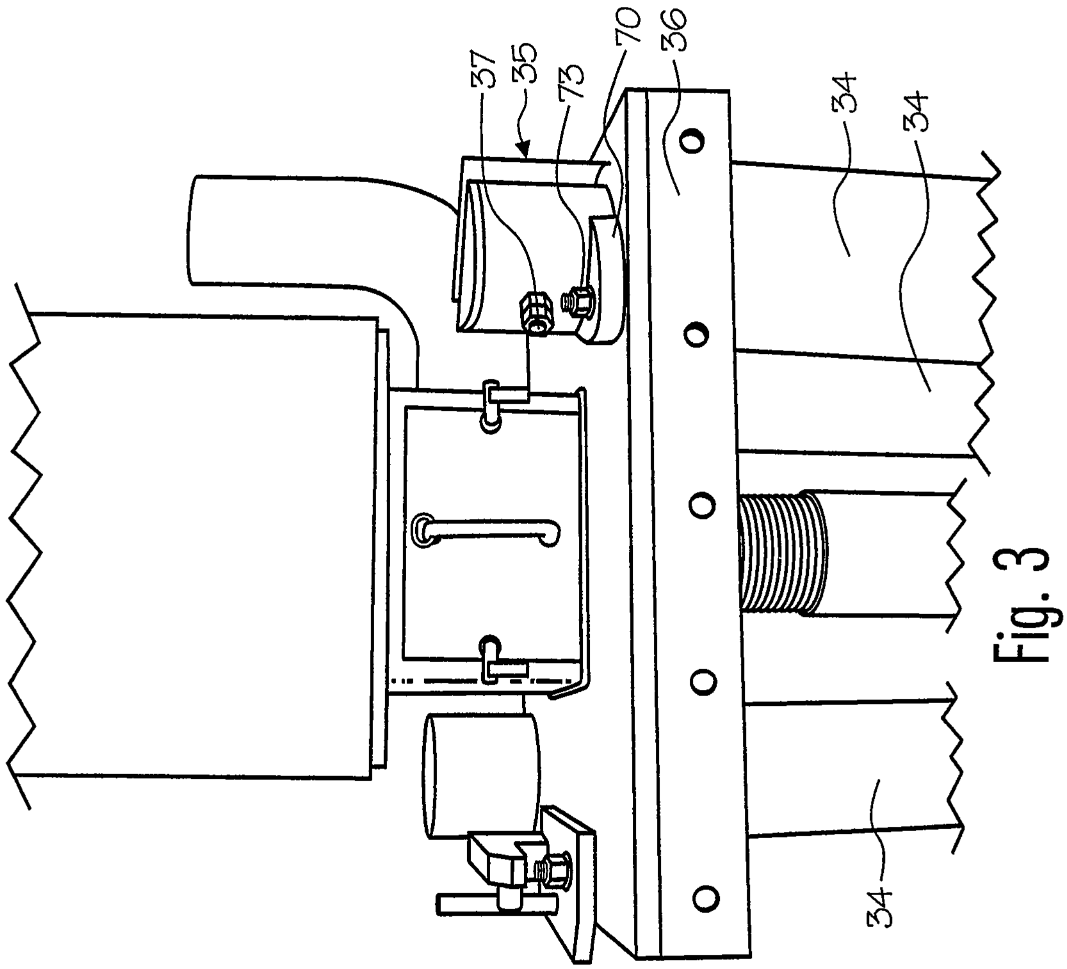
FIG. 3 is a side view of the post clamp of FIGS. 1 and 2, wherein the post clamp is mounted on a molten metal pump.

One or more support posts 34 extend form base 24 to a superstructure 34 of pump 20 thus supporting superstructure 36. In the preferred embodiment, post clamps 35 secure posts 36 to superstructure 34. A support post 34 is of any structure, shape and size suitable for use in a molten metal environment and for supporting superstructure 36, but each support post 34 is preferably cylindrical, comprised of graphite and has about a 4" diameter. Each support post 34 has a first end 34A that connects to pump base 24 and a second end 34B (as shown in FIG. 1A) that extends through superstructure 36 and interfaces with post clamp 35. Second end 34B has a top 34C, which is preferably flat. Because the height of superstructure 36 will be determined by the height of the support posts, if a plurality of support posts is used, each support post 34 is substantially the same height, meaning each is machined to a given height plus or minus about 0.010".

Each support post 34 has an outer surface 34D (which is preferably annular) and preferably has no grooves machined on outer surface 34D at end 34B, since grooves will likely not be used to support any of the weight of the superstructure. Preferably, a through-bolt hole 34E is machined in end 34B in order to provide compressive force to the two pieces of clamp 35, as described below. However, through-bolt 34E hole is optional. Further, because through-bolt hole 34E does not determine the height of superstructure 36, the diameter of hole 34E can be larger than the diameter of the through-bolt 37 used. Preferably, the diameter of through-bolt hole 34E is at least about 1/32" larger than the diameter of through bolt 37. This makes installation of a post clamp 35, should it include a through bolt hole, easier since bolt 37 can easily be inserted through hole 34E.

Post clamp 35 is preferably a two-piece clamp, made of steel, having substantially identical halves 35A and 35B, so only one half shall be described in detail. Half 35A has a lower flange 70 that includes an aperture for receiving bolt 37. Flange 70 is for connecting clamp half 35A to superstructure

34 and can be any structure or device suitable for this purpose. Half 35A includes a semi-cylindrical wall 74 having an aperture 76 and an upper flange 78. Preferably, section 74 is welded to flanges 70 and 78 although it can be connected to the flanges in any manner.

In use, a support post 34 is positioned through a hole (not shown) in superstructure 36 so that end 34B extends above superstructure 36. Halves 35A and 35B are positioned, respectively, on opposite sides of end 36B. Bolt 37 is passed through aperture 76 in wall 74 of half 35A, through bolt hole 34E and through aperture 76 in half 35B. A nut is applied to the bolt and as the nut is tightened it draws together the halves 35A and 35B together around end 34B so that end 34B is contained within the cavity formed by semi-cylindrical walls 74. Bolts are passed through each aperture 72 to secure the post clamp 35 to superstructure 34. When mounted as described, flanges 78 are positioned above top 34C of end 34B and support at least part of the weight of superstructure 36. However, any structure suitable for enabling at least part of the weight of superstructure 36 to be supported by the tops of one or more support posts may be used instead of flanges.

Having thus described different embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired product.

What is claimed is:

1. A pump for pumping molten metal, the pump having:
(a) a pump base,
(b) a superstructure, and
(c) at least three support posts, wherein each support post has an upper end and a top surface end connects the pump base to the superstructure, and the superstructure has an upper surface and includes post clamps on its upper surface, wherein each post clamp has an upper flange with an inner surface, and each post clamp receives the upper end of one of the plurality of support posts, and the top surface of each support post rests against the inner surface of the upper flange to support at least part of the weight of the superstructure; and each support post has a height of plus or minus 0.010" of the height of each of the other of the plurality of support posts.

2. The pump of claim 1 that further includes a ceramic sleeve on at least one of the support posts.

3. The pump of claim 1 wherein each of the support posts is comprised of graphite.

4. The pump of claim 1 wherein each of the support posts further includes a ceramic sleeve.

5. The pump of claim 1 wherein each of the support posts includes a through bolt hole at its upper end.

6. The pump of claim 1 wherein each support post has lifting means for lifting the pump base when the pump is being moved, and support means for supporting at least part of the weight of the superstructure when the pump is in use.

7. The pump of claim 6 wherein the lifting means is a through bolt hole in the support post, and a bolt passing through the through bolt hole and connected to a post clamp on a superstructure.

* * * * *